United States Patent [19]
Livingston

[11] Patent Number: 5,884,430
[45] Date of Patent: Mar. 23, 1999

[54] CONNECTOR FOR LEADING AND TRAILING FISHING HOOKS

[76] Inventor: Vincent S. Livingston, 6282 Edward Cir., Smithfield, Va. 23430

[21] Appl. No.: 749,220

[22] Filed: Nov. 14, 1996

[51] Int. Cl.⁶ ................................................. A01K 83/00
[52] U.S. Cl. ........................... 43/44.82; 24/908; 24/599.6
[58] Field of Search ............................. 43/43.16, 44.82, 43/43.1, 44.83, 44.8; 24/908, 599.6; 403/209, 206, 207, 291

[56] References Cited

U.S. PATENT DOCUMENTS

| | | | |
|---|---|---|---|
| 372,686 | 11/1887 | Lester | 43/44.83 |
| 772,333 | 10/1904 | Biersach | 24/908 |
| 913,440 | 2/1909 | Sutton | 24/908 |
| 1,222,774 | 4/1917 | Leonard . | |
| 1,547,619 | 7/1925 | Shannon . | |
| 1,867,555 | 7/1932 | Hildebrandt . | |
| 2,281,809 | 5/1942 | Smith . | |
| 2,419,753 | 4/1947 | Adair . | |
| 2,423,615 | 7/1947 | Pecher . | |
| 2,443,753 | 6/1948 | Tusa . | |
| 2,616,208 | 11/1952 | Stogermayr | 43/44.83 |
| 2,621,438 | 12/1952 | Hellin | 43/43.16 |
| 2,632,278 | 3/1953 | Raymond | 43/44.82 |
| 2,636,307 | 4/1953 | Mason | 43/44.83 |
| 2,680,321 | 6/1954 | Premo | 43/44.82 |
| 2,709,287 | 5/1955 | Shelton et al. | 24/908 |
| 2,782,551 | 2/1957 | Raymond | 43/44.82 |
| 2,908,990 | 10/1959 | Rimbach . | |
| 2,922,247 | 1/1960 | Buss . | |
| 3,803,747 | 4/1974 | Cartwright . | |
| 4,209,933 | 7/1980 | Manno | 43/44.83 |
| 4,232,470 | 11/1980 | Steffick, Jr. . | |
| 4,280,296 | 7/1981 | Volence . | |
| 4,470,217 | 9/1984 | Adams . | |
| 4,569,148 | 2/1986 | Kemp . | |
| 4,750,291 | 6/1988 | Chilton . | |
| 4,905,402 | 3/1990 | Clark . | |
| 4,930,246 | 6/1990 | Cunningham | 43/44.8 |
| 5,664,365 | 9/1997 | Walden | 43/44.82 |

FOREIGN PATENT DOCUMENTS 1085713  7/1954  France .

OTHER PUBLICATIONS

Exhibit A (Author Unknown, *Stinger Hooks And Spinnerbaits*, Date Unknown).
Exhibit B (Mike Thakham, *Keep A Trailer Hook In Place*, date Unknown).

*Primary Examiner*—Kurt Rowan
*Attorney, Agent, or Firm*—MacMillan, Sobanski & Todd, LLC

[57] ABSTRACT

A fishing hook assembly including a connector for maintaining two J-shaped fishing hooks connected in tandem in axial alignment and occupying a common plane. The connector comprises a wire coiled in the center to define an eye. At both ends of the coil forming the eye, the wire projects outwardly to form parallel arms each terminating in a bent finger or hook. The arms are of unequal length. The two bent fingers are disposed perpendicularly to one another prior to installation. Each bent finger occupies a plane perpendicular to the other, and also perpendicular to a plane perpendicular to the longitudinal axis of the coil. After assembly, the eye of the connector encircles the rod of the leading hook. The short arm projects forwardly to engage the rod of the leading hook by its respective bent finger. The long arm projects to the rear to engage the rod of the trailing hook by its respective bent finger.

18 Claims, 3 Drawing Sheets

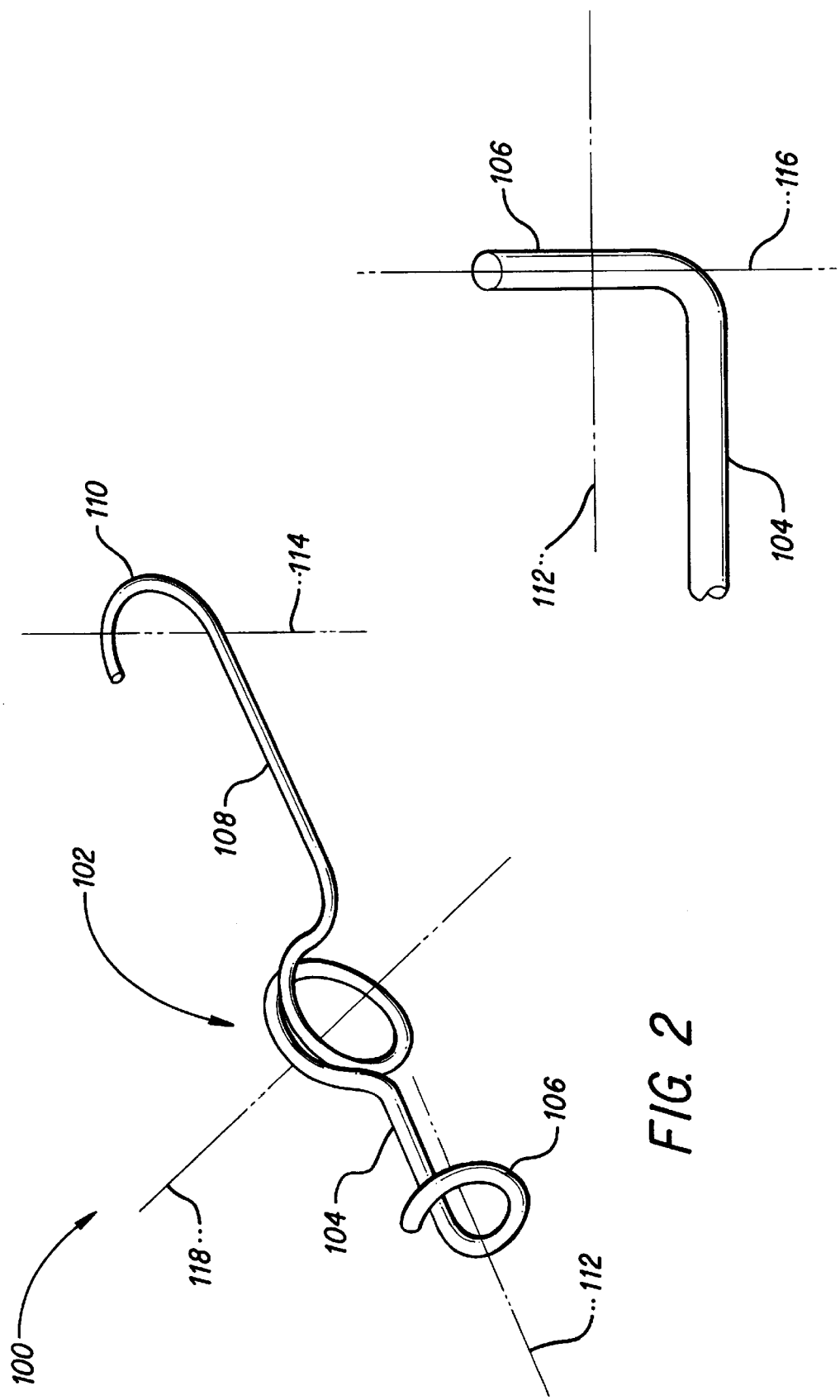

CONNECTOR FOR LEADING AND TRAILING FISHING HOOKS

BACKGROUND OF THE INVENTION

1. Field of the Invention

The present invention relates generally to a fishing hook and more particularly to a fishing hook having plural piercing points. Still more specifically, the invention provides a connector for maintaining a trailer hook in operable orientation relative to a leading hook, while still enabling some relative motion therebetween to facilitate assembly of the fishing hooks.

2. Description of the Prior Art

When fishing with spoons, spinner baits, or lures that require constant movement, the fisherman frequently encounters fish which strike at the tail of the lure, missing the hook. A traditional response to this situation is to attach a trailing hook. However, this response generates its own problems. The second hook must be maintained in an effective orientation with respect to the first hook.

It is preferable that two hooks connected in tandem be maintained in axial alignment and also in a common plane. The prior art has suggested apparatus for maintaining a trailing hook at a desired orientation with respect to a leading hook. An example is seen in U.S. Pat No. 4,569,148, issued to Wallace W. Kemp on Feb. 11, 1986. Kemp's device comprises a wire spine to which two hooks are secured by coils of wire. By contrast, the present invention lacks two coils of wire serving as encircling ties. The present invention has two hooks, which will be referred to as bent fingers to avoid confusion with the pointed hooks utilized to engage fish, the bent fingers being disposed at opposing ends of a common wire.

U.S. Pat No. 2,443,753, issued to Victor Tusa on Jun. 22, 1948, describes a fishing lure having a flattened rod which holds a second hook to a first hook. This rod has two holes formed therein. Each fishing hook passes through one of the two holes. By contrast, the present invention lacks holes, relying instead upon bent fingers each one of which engages the straight section of one hook. The common wire bearing the two bent fingers is coiled at the center. This coil surrounds the leading fishing hook.

U.S. Pat No. 2,908,990, issued to Harry J. Rimbach on Oct. 20, 1959, describes a fishing hook arrangement wherein one hook terminates at an eye. This eye is slipped over the leading hook. Unlike the present invention, there is no separate wire member engaging each hook and holding the two hooks resiliently in a predetermined mutual orientation.

U.S. Pat No. 3,803,747, issued to Earl Cartwright on Apr. 16, 1974, illustrates a fishing hook terminating in an eye and engaging a leading fishing hook by encirclement. Unlike the present invention, no connector maintains the two hooks in a predetermined mutual orientation.

Thus it will be seen that the prior art has not provided readily removable apparatus for maintaining tandem fishing hooks axially aligned and occupying a common plane. None of the above inventions and patents, taken either singly or in combination, is seen to describe the instant invention as claimed.

SUMMARY OF THE INVENTION

The present invention comprises a fishing hook assembly comprising two conventional, simple fishing hooks in leading and trailing relationship, and particularly a connector for joining two conventional, simple fishing hooks in this relationship. As employed herein, "simple" signifies that each hook is configured as a J, having a curved section and a straight section projecting from the curved section. Conventional hooks terminate in an eye for attachment to fishing line or other apparatus. The two hooks both occupy a common plane and remain in axial alignment after securement, so that a fish snapping or striking at the associated lure is more likely to engage a hook than would be the case if the hooks were not closely secured together as described.

The novel connector comprises a resilient wire bent to form a central coil having two projecting arms. One arm is relatively long, and the other is relatively short. Each arm terminates in a bent finger. The leading fishing hook is engaged by the connector at two points. The central coil, or eye, surrounds the rod of the leading fishing hook. The short arm extends roughly parallel to the rod of the leading fishing hook and partially surrounds the same.

The trailing fishing hook has an eye which is slipped over the leading fishing hook. The two fishing hooks are then secured in position occupying a common plane by the novel connector. The eye of the connector is slipped over the leading fishing hook, and the bent finger of the shorter arm is interlocked with a straight section of the leading fishing hook. The bent finger of the longer arm is then interlocked with a straight section of the trailing fishing hook.

While some play exists in the assembled fishing hooks which enables slight relative movement, the two fishing hooks are secured in leading and trailing fashion, with hooks pointing in the same direction. The novel connector remains in place, maintaining the original positions of the secured fishing hooks, and need not be adjusted or removed to reposition the fishing hooks. The novel connector is manually installed and removed from conventional, simple fishing hooks.

The novel connector is preferably formed from a corrosion resistant material with a degree of spring qualities, such as stainless steel. This construction assures that the novel connector resist deterioration which tends to plague plastic and rubber members which are occasionally employed to connect fishing hooks. The rod stock of the connector may be less than that of the hooks.

Accordingly, it is a principal object of the invention to provide a connector for connecting two simple fishing hooks together in leading and trailing relationship.

It is another object of the invention to cause the fishing hooks to occupy a common plane.

It is a further object of the invention to enable the user to employ simple, conventional fishing hooks in the fishing hook assembly secured by the novel connector.

Still another object of the invention is to resist deterioration of apparatus securing two fishing hooks together.

An additional object of the invention is to enable manual assembly and disassembly of fishing hooks utilizing a connector.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 2 is a perspective view of the novel connector located towards the center of FIG. 1, and drawn to enlarged scale.

FIG. 3 is a side elevational detail view of the bent finger, drawn to enlarged scale.

DETAILED DESCRIPTION OF THE PREFERRED EMBODIMENTS

Figure 1:
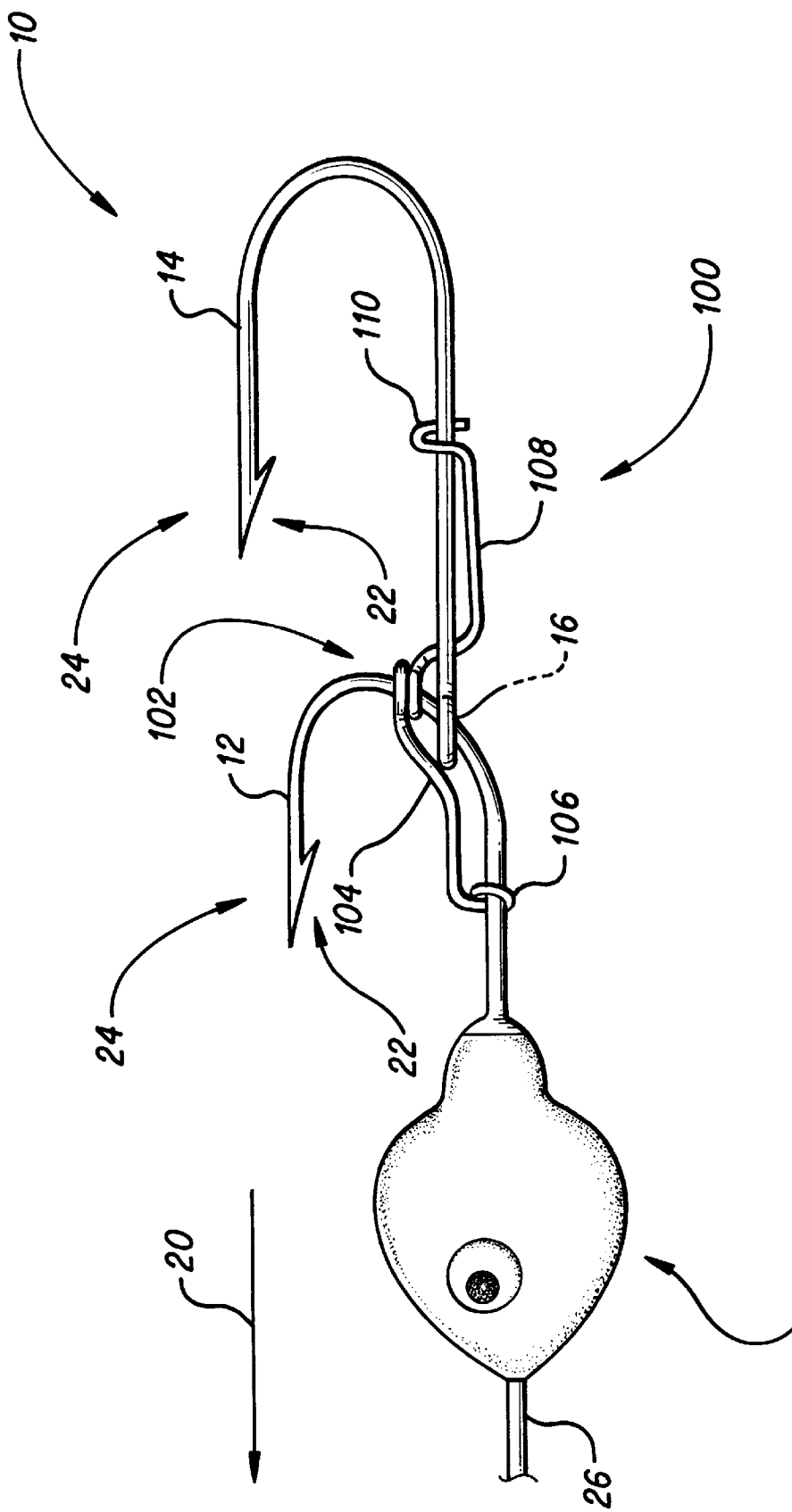
FIG. 1 is a side elevational view of the invention.

FIG. 1 of the drawings illustrates a fishing hook assembly 10 comprising a leading fishing hook 12 and a trailing fishing hook 14 disposed in a common plane. Hooks 12 and 14 are mutually joined by slipping eye 16 of hook 14 over hook 12. Hook 12 is shown connected to a lure 18. Lure 18 indicates the forward direction of travel through water (not shown), as indicated by arrow 20. Surfaces of the invention facing the direction of travel will be referred to as forward surfaces, and surfaces facing oppositely the direction of travel will be referred to as rear surfaces.

Hooks 12, 14 are configured in the form of a J, having a proximal end 22 bearing at least one point 24. Eye 16 is formed at a distal end of hook 14. Hooks 12, 14 are commonly available, conventional fishing hooks.

Hooks 12 and 14 are secured in axial alignment in leading and trailing relationship and occupying a common plane, as depicted in FIG. 1, by a connector 100. Connector 100 is a member separate and manually removable from both hooks 12 and 14.

Connector 100 is formed from wire, and engages hook 12 at two spaced apart points. An eye 102 formed by a coil of wire comprising connector 100 is located roughly towards the center of connector 100. A first arm 104 projects forwardly from eye 102, and terminates in a bent finger 106 for engaging hook 12 at a point spaced apart from eye 102.

A second arm 108 projects rearwardly from eye 102 and terminates in a second bent finger 110 engaging hook 14. Thus hook 12 is engaged by connector 100 by eye 102 and at bent finger 106. Hook 14 is engaged by connection to hook 12 at eye 16 and also by connector 100 at bent finger 110.

These points of connection in combination with the semi-rigid nature of connector 100 serve to secure hooks 12 and 14 in both axial alignment and in a common plane. It is not necessary that eye 102 of connector 100 comprise a coil of wire, but merely that eye 102 encircle leading hook 12. An advantage of coiled construction of eye 102 is that the coil can open or spread slightly so that connector 100 may be manipulated into engagement with hooks 12 and 14 during assembly.

FIG. 2 shows specific characteristics of connector 100. The coil of wire comprising eye 102 is preferably limited to one and one half convolutions of wire. This characteristic assures that eye 102 will be compact, while still retaining resilient tendency to maintain a circular configuration.

Construction of connector 100 from wire also enables ready fabrication, since it is an easy matter to wind the wire in a coil to form eye 102. Similarly, the ends of the wire are readily wound into bent fingers 106 and 110. Of course, bent fingers 106 could have a configuration other than semicircular. For example, they may be square or V-shaped. While these configurations may be suitable, it is felt that semicircular configuration is most easily worked by hand during assembly. In particular, bent fingers 106, 110, if semicircular, are each readily slipped over a section of their respective associated fishing hook 12 or 14 and maintain engagement with the same.

It will further be apparent from FIG. 2 that arms 104 and 108 are parallel. They are in fact nearly coaxial, except that thickness of the coil of wire forming eye 102 interferes with coaxial alignment in the absence of more complex bending of the wire. This construction promotes compactness not merely of connector 100, but also of the assembly comprising connector 100 and hooks 12 and 14. Thus, straight tracking of the assembly when drawn through water is not unduly disturbed.

FIG. 2 further reveals that planes occupied by first bent finger 106 and second bent finer 110 are disposed perpendicularly to one another. Also, both of these planes are disposed perpendicularly to the plane occupied by eye 102. This interrelationship causes connector 100 to be effective in both maintaining coaxial alignment of hooks 12 and 14, and also in maintaining hooks 12 and 14 in a common plane.

Each bent finger 106 or 110 has an axis 112 or 114, respectively passing through the circle described in part by bent finger 106 or 110. Axis 112 also defines the longitudinal dimension of connector 100. The planes referred to above are perpendicular to respective axes 112 and 114, and pass through the center of the wire forming the respective bent fingers 106 or 110. This is shown in FIG. 3, wherein plane 116 bisects the wire of bent finger 106 and also is perpendicular to axis 112. The theoretical plane occupied by bent finger 110 is determined in similar fashion.

In the case of eye 102, the theoretical plane is disposed perpendicularly to axis 118, and is located at the center of eye 102. In the depiction of FIG. 2, the theoretical plane occupied by eye 102 may be said to separate the two adjacent convolutions of wire shown.

It would be possible to modify the strict perpendicular relationships among the three said planes such that each plane intersected the others. However, this is felt to reduce effectiveness, possibly with respect to straight tracking when the assembled hooks 12, 14 and connector 100 are drawn through water.

FIG. 2 also shows that arm 104 is relatively short in relation to arm 108. Arm 108 thus extends well along hook 14, and consequently enjoys increased leverage in controlling hook 14 (see FIG. 1). This situation is desirable since hook 12 is partially restrained with respect to departing from axial alignment with fishing line 26 (see FIG. 1) when being drawn through water. Attachment to fishing line 26 at a forward point, weight of trailing hook 14 imposed by connection of eye 16 towards the rear of hook 12, and engagement by connector 100 at bent finger 106 and at eye 102 all combine to exert restraining influences over hook 12.

By contrast, hook 14 is engaged at only two points. These are at eye 16 and by bent finger 110. Thus, additional length of arm 108 locates bent finger 110 at a greater distance from eye 16 than would otherwise occur. Wagging or other undesirable motion of hook 14 relative to hook 12 is thus minimized.

While the two arms could be of equal length, both being sufficiently long to locate bent finger 110 as desired, consequent additional length of connector 100 would be undesirable, since manipulation during assembly would be rendered all the more difficult. The solution of unequal length arms 104 and 108 both securely engages trailing fishing hook 14 and also minimizes overall length of connector 100.

Figure 4:
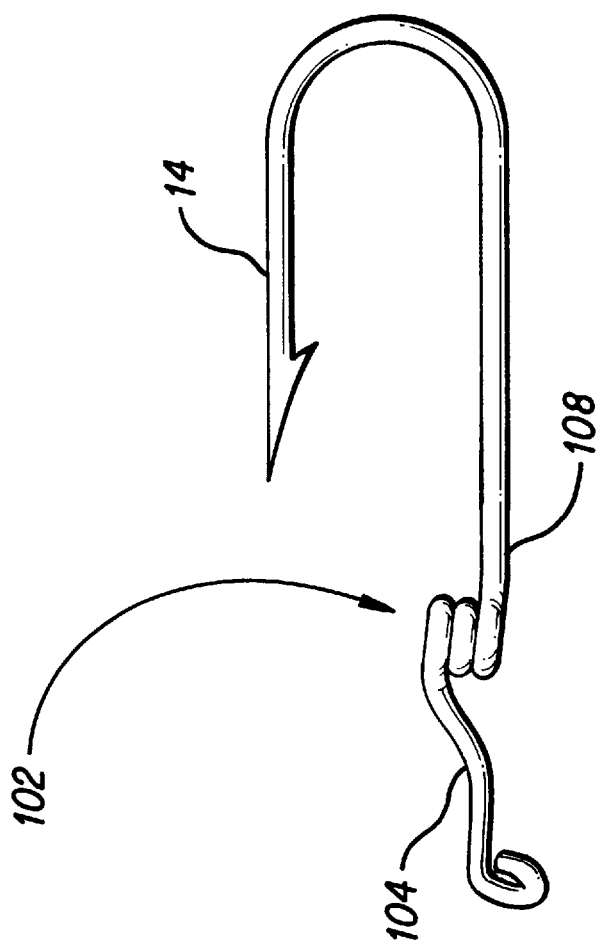
FIG. 4 is a side elevational view of an alternative embodiment of the present invention.

FIG. 4 shows an alternative embodiment, wherein second arm 108 is integral with the distal end of hook 10, eliminating eye 16 and bent finger 110. In this embodiment, eye 102 and bent finger 106 engage hook 12 as described above. Integrating connector 100 and hook 14 eliminates separate connector 100 and hook 14 configuration as shown above.

It is to be understood that the present invention is not limited to the embodiments described above, but encompasses any and all embodiments within the scope of the following claims.

I claim:

1. A connector for securing two conventional fishing hooks in axial alignment in leading and trailing relationship and occupying a common plane, comprising:

first engagement means for engaging a first fishing hook;

a first arm projecting forwardly from said first engagement means and terminating in second engagement means for engaging the first fishing hook, whereby the first fishing hook is engaged at two points spaced apart from one another; and a second arm projecting rearwardly from said first engagement means and terminating in third engagement means for engaging a second fishing hook said second engagement means and said third engagement means each comprising a bent finger, said first bent finger and said second bent finger arranged to occupy planes disposed perpendicularly to one another.

2. The connector according to claim 1, said first engagement means comprising an eye.

3. The connector according to claim 2, said connector being formed from wire, said eye comprising a coil formed in said wire, whereby said eye can spread slightly and said connector may be readily manipulated into engagement with the fishing hooks.

4. The connector according to claim 3, said coil of wire being limited to one and one half convolutions of wire, whereby said eye is compact while still retaining resilient tendency to maintain a circular configuration.

5. The connector according to claim 1, said first arm and said second arm being disposed parallel to one another.

6. The connector according to claim 1, each one of said first bent finger and said second bent finger occupying first and second intersecting planes, said eye occupying a third plane intersecting each one of said first and second intersecting planes.

7. The connector according to claim 1, said first bent finger and said second bent finger each forming a semicircle, whereby said first bent finger and said second bent finger are each readily slipped over a section of an associated fishing hook and said first bent finger and said second bent finger each maintain engagement with their associated fishing hooks.

8. The connector according to claim 1, wherein said first arm is relatively short and said second arm is relatively long, whereby said first arm securely engages the leading fishing hook and said second arm extends well along and securely engages the trailing fishing hook.

9. A connector for securing two conventional fishing hooks in axial alignment in leading and trailing relationship and occupying a common plane, comprising:

an eye comprising a coil of wire, for encircling a first fishing hook, whereby said eye can spread slightly and said connector may be readily manipulated into engagement with the fishing hooks;

a first arm projecting forwardly from said eye and terminating in a semicircular bent finger for engaging the first fishing hook at a point spaced apart from said eye, whereby the first fishing hook is engaged at two points spaced apart from one another; and a second arm projecting rearwardly from said eye and terminating in a second semicircular bent finger for engaging a second fishing hook, whereby said first bent finger and said second bent finger are each readily slipped over a section of an associated fishing hook and said first bent finger and said second bent finger each maintain engagement with their associated fishing hooks, said first arm and said second arm being disposed parallel to one another, whereby said connector is compact, and said first arm being relatively short and said second arm being relatively long, whereby said first arm securely engages a leading fishing hook and said second arm extends well along and securely engages a trailing fishing hook, said first bent finger and said second bent finger arranged to occupy respective first and second planes disposed perpendicularly to one another, and said eye occupying a third plane intersecting each one of said first and second planes.

10. The connector according to claim 9, said coil of wire being limited to one and one half convolutions of wire, whereby said eye is compact while still retaining resilient tendency to maintain a circular configuration.

11. A fishing hook assembly providing a leading fishing hook and a trailing fishing hook both occupying a common plane, comprising:

a first fishing hook and a second fishing hook each configured as a J having a proximal end bearing a point, said second fishing hook further having a distal end, said second fishing hook terminating in an eye at its said distal end and engaging said first fishing hook by encirclement of said first fishing hook by said eye of said second fishing hook; and control means for maintaining said first fishing hook and said second fishing hook in leading and trailing positions, respectively, and for maintaining said first fishing hook and said second fishing hook disposed to occupy a common plane, said control means comprising separate member manually removable from said first fishing hook and said second fishing hook, said control means comprising a connector having:

first engagement means for engaging one said fishing hook, said first engagement means comprising an eye;

a first arm projecting forwardly from said first engagement means and terminating in second engagement means for engaging said first fishing hook, whereby said first fishhook is engaged at two points spaced apart from one another;

a second arm projecting rearwardly from said first engagement means and terminating in third engagement means for engaging said second fishing hook, said connector being formed from wire, said eye comprising a coil formed in said wire, whereby said eye can be spread slightly and may be readily manipulated into engagement with the fishing hooks.

12. The fishing hook assembly according to claim 11, said coil being limited to one and one half convolutions of said wire, whereby said eye is compact while still retaining resilient tendency to maintain a circular configuration.

13. A fishing hook assembly providing a leading fishing hook and a trailing fishing hook both occupying a common plane, comprising:

a first fishing hook and a second fishing hook each configured as a J having a proximal end bearing a point, said second fishing hook further having a distal end, said second fishing hook terminating in an eye at its said distal end and engaging said first fishing hook by encirclement of said first fishing hook by said eye of said second fishing hook; and control means for maintaining said first fishing hook and said second fishing hook in leading and trailing positions, respectively, and for maintaining said first fishing hook and said second fishing hook disposed to occupy a common plane, said control means comprising a separate member manually removable from said first fishing hook and said second fishing hook, said control means comprising a connector having:

first engagement means for engaging one said fishing hook, said first engagement means comprising an eye;

a first arm projecting forwardly from said first engagement means and terminating in second engagement means for engaging said first fishing hooks, whereby said first fishhook is engaged at two points spaced apart from one another;

a second arm projecting rearwardly from said first engagement means and terminating in third engagement means for engaging said second fishing hook, said second engagement means and said third engagement means each comprising a bent finger.

14. The fishing hook assembly according to claim 13, said first arm and said second arm being disposed parallel to one another.

15. The fishing hook assembly according to claim 13, said first bent finger and said second bent finger arranged to occupy planes disposed perpendicularly to one another.

16. The fishing hook assembly according to claim 13, each one of said first bent finger and said second bent finger occupying first and second intersecting planes, said eye occupying a third plane intersecting each one of said first and second intersecting planes.

17. The fishing hook assembly according to claim 13, said first bent finger and said second bent finger each forming a semicircle, whereby said first bent finger and said second bent finger are each readily slipped over a section of an associated fishing hook and said first bent finger and said second bent finger each maintain engagement with their associated fishing hooks.

18. The fishing hook assembly according to claim 13, wherein said first arm is relatively short and said second arm is relatively long, whereby said first arm securely engages the leading fishing hook and said second arm extends well along and securely engages the trailing fishing hook.

* * * * *